United States Patent [19]

Halstrick

[11] Patent Number: 4,796,541
[45] Date of Patent: Jan. 10, 1989

[54] STORAGE RACK

[76] Inventor: Robert T. Halstrick, c/o Scotland Rack Ltd., Willow Grove, Pa. 19090

[21] Appl. No.: 80,741

[22] Filed: Jul. 31, 1987

[51] Int. Cl.$^4$ ............................................. A47B 3/00
[52] U.S. Cl. ..................................... 108/111; 211/190
[58] Field of Search ............... 108/111, 110, 107, 144; 211/182, 187, 191, 192, 189, 190, 207, 208

[56] References Cited

U.S. PATENT DOCUMENTS

| | | | |
|---|---|---|---|
| 2,937,767 | 5/1960 | Butler et al. | 211/191 |
| 3,672,515 | 6/1972 | Rous | 211/191 |
| 3,765,344 | 10/1973 | Ferdinand et al. | 108/111 X |
| 3,862,691 | 1/1975 | Mori et al. | 211/191 |
| 3,883,104 | 5/1975 | Delafield | 211/182 X |
| 4,064,996 | 12/1977 | Shillum | 211/191 |
| 4,074,812 | 2/1978 | Scubic et al. | 211/191 X |
| 4,341,486 | 7/1982 | Hammerschlag | 211/192 X |
| 4,342,397 | 8/1982 | Halstrick | 211/191 |
| 4,425,049 | 1/1984 | Travis | 211/191 X |
| 4,496,061 | 1/1985 | Highsmith | 211/191 |

FOREIGN PATENT DOCUMENTS 2497164 9/1980 France ............................... 211/191

Primary Examiner—Kenneth J. Dorner
Assistant Examiner—José V. Chen
Attorney, Agent, or Firm—Z. T. Wobensmith, III

[57] ABSTRACT

A storage rack which has pairs of upright columns or posts connected in pairs by a plurality of connecting members to form rack ends, which are connected together by shelf support members at selected heights to provide shelf supports, the ends of each of the members having angularly related portions for locking engagement in angular openings in the columns, and which columns have removable end caps at the top and bottom.

3 Claims, 3 Drawing Sheets

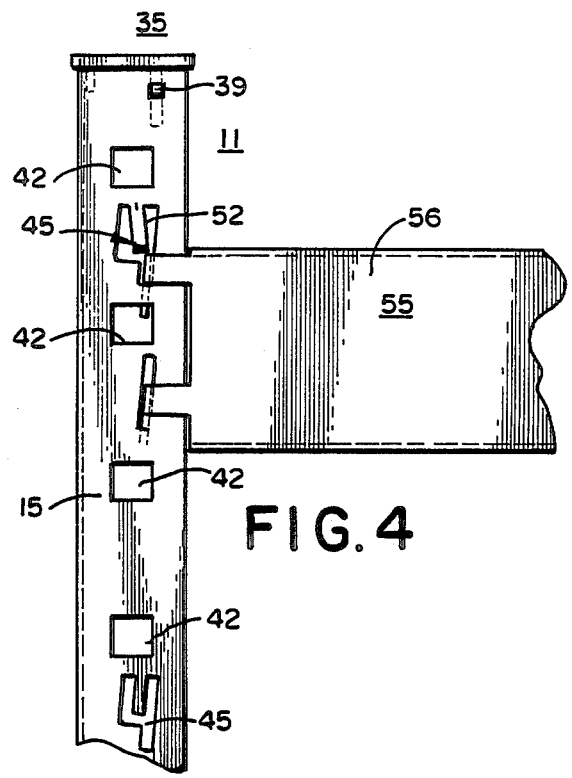
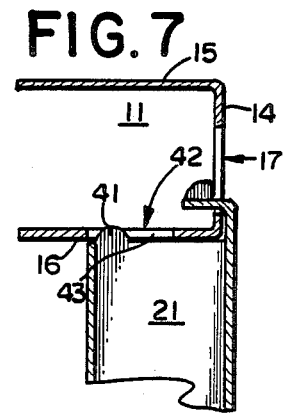
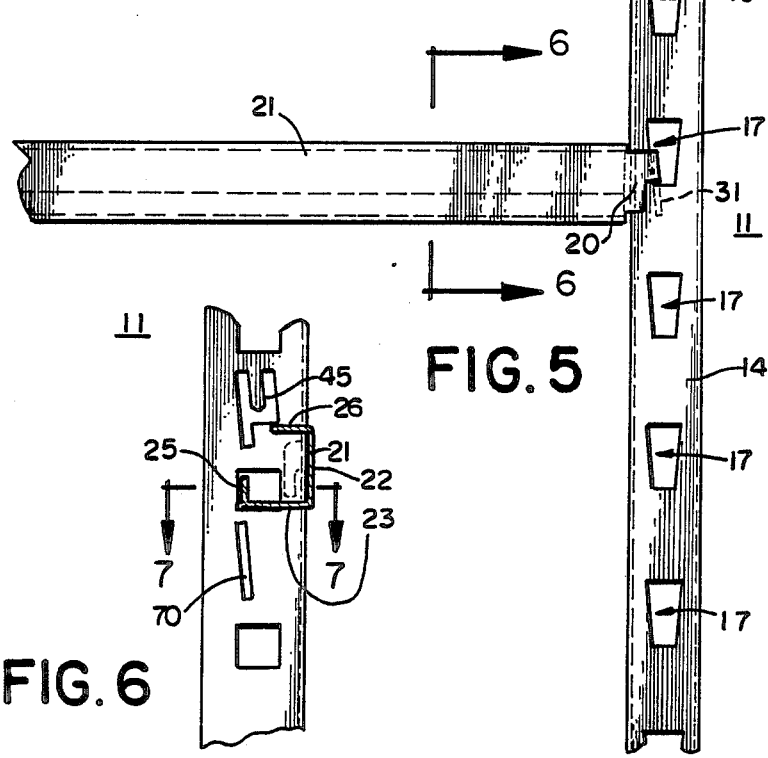

STORAGE RACK

BACKGROUND OF THE INVENTION

1. Field of the Invention

This invention relates to storage racks of the knockdown variety, which have columns or posts connected together in pairs by horizontal connecting members engaged in the columns for locking engagement to form rack ends and with shelf support members connecting the rack ends together to form a rack. 2. Description of the Prior Art It is common practice to provide storage racks which have upright columns or posts that are connected in pairs by horizontal and diagonal braces parallel to the direction of access to provide rack ends, and with pairs of posts joined front and rear by horizontal crossbeams, the structure of which may be welded at the factory or bolted together in the field to maintain the rack in assembled condition.

Featherman et al., in U.S. Pat. No. 3,788,490 shows bracing members, and upright posts of an erectable shelving rack or frame, and connectors engaging the posts and to which the bracing members are bolted.

Hasselqvist, in U.S. Pat. No. 4,069,638 shows conventional gusset type connectors 18 for joining horizontal beams to upright posts.

Wright, in U.S. Pat. No. 4,053,245 shows a separate connector for joining crossbeams to vertical posts.

In my prior U.S. Pat. No. 4,342,397 there is disclosed an effective structure for connecting the crossbeam members and the posts together, but it is complicated and requires a greater number of parts than the structure of the present invention.

None of the prior art patents discloses the simple but effective locking structure of the invention for fastening the columns, shelf support members and horizontal connecting members together, without the necessity of employing diagonal braces, and which can be easily assembled and disassembled.

SUMMARY OF THE INVENTION

In accordance with the invention, a storage rack is provided which has pairs of vertical columns or posts connected together by horizontal connecting members to form rack ends, which rack ends are connected together by horizontal shelf support connecting and shelf support members at selected heights, the members having tapered wedging end portions, which engage in tapered openings in the columns for locking engagement, and which structure will carry the loads placed on the shelves.

It is the principal object of the invention to provide a storage rack which is simple in construction and which may be quickly and easily assembled at the place of use.

It is a further object of the invention to provide a storage rack which is inexpensive to construct, but which is sturdy and reliable in use.

It is a further object of the invention to provide a storage rack which permits of easily varying the shelf height.

It is a further object of the invention to provide a storage rack that can be readily extended by adding additional rack ends and connecting shelf support members.

It is a further object of the invention to provide a storage rack with positive locking engagement of the columns or posts and the shelf support and horizontal connecting members, but which members may be easily unlocked as desired.

It is a further object of the invention to provide a storage rack which has removable end caps to provide for column support and to close off the ends of the columns.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 4 is an end elevational view of a portion of a rack end column and connecting member;

FIG. 5 is a side elevational view of a column of a rack end showing a portion of an engaged shelf support member;

FIG. 6 is a vertical sectional view taken approximately on the line 6—6 of FIG. 5; and FIG. 7 is a fragmentary horizontal sectional view taken approximately on the line 7—7 of FIG. 6.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Figure 1:
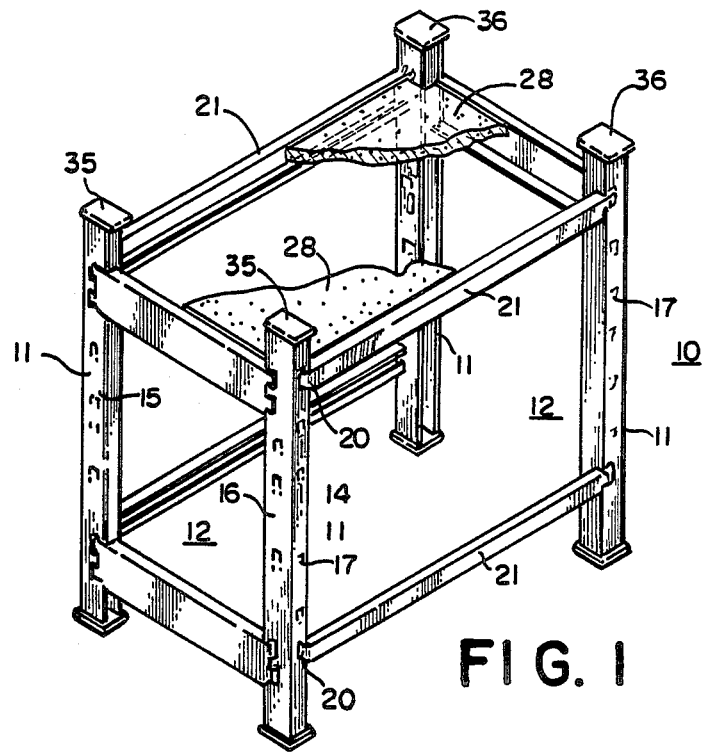
FIG. 1 is a view in perspective of a preferred embodiment of a storage rack of the invention.
Figure 2:
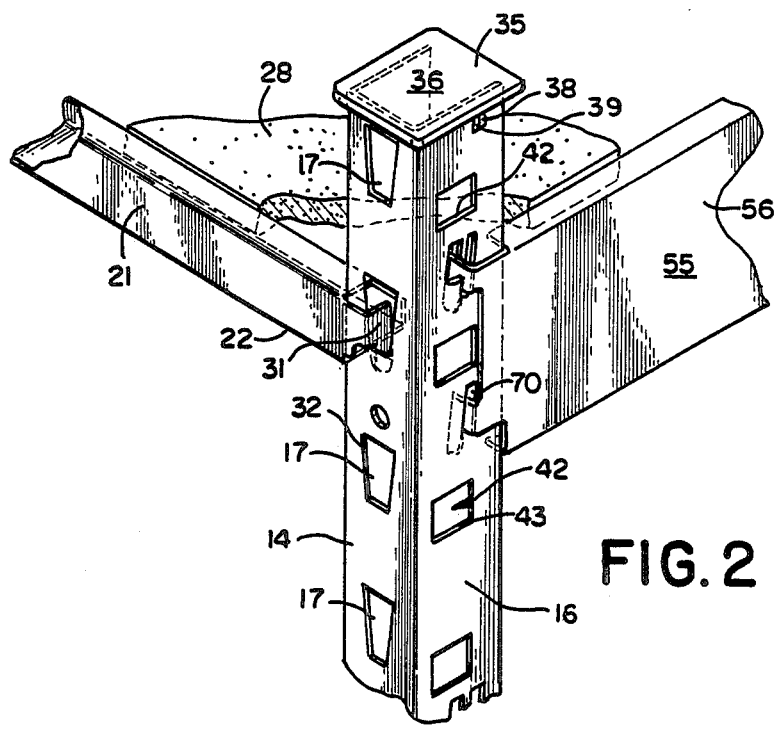
FIG. 2 is a view in perspective showing the joining of an upright post with horizontal connecting and shelf support members.

Referring now more particularly to the drawings and FIG. 1 thereof, a storage rack 10 in accordance with the invention is therein illustrated, which includes upright columns or posts 11 which are disposed in pairs to form a rack end 12. The columns 11 are of U-shape in cross section and preferably constructed of sheet metal, of a desired length to provide the height or heights required for the rack shelving. The columns 10 each include a vertical outside wall 14, with parallel vertical side walls 15 and 16 extending therefrom.

The outside walls 14 are provided with a plurality of spaced truncated cone shaped openings 17 located therealong at heights suitable for shelving. As shown in FIG. 1 columns 11 have engagement portions 20 of horizontal shelf support members 21 engaged in selected openings 17, which connect columns of pairs of rack ends 12 together. Referring additionally to FIGS. 2 to 7, the shelf support members 21 are of a generally open rectangular configuration, and each includes a vertically extending front wall 22, bottom wall 23 perpendicular thereto, a vertically upwardly extending shelf support flange 25 and a top wall 26 perpendicular to wall 22. The wall 26 in the assembled condition extends over an edge 17 of a shelf 28, which is supported on the flange 25.

The shelf 28 is of 5/8 inch thickness in the preferred embodiment and may be of pressed or composition material, such as wood chips.

The wall 22 has a cut-out portion 29 and an L-shaped downwardly and forwardly extending wedging tongue 31 extending therefrom.

Figure 3:
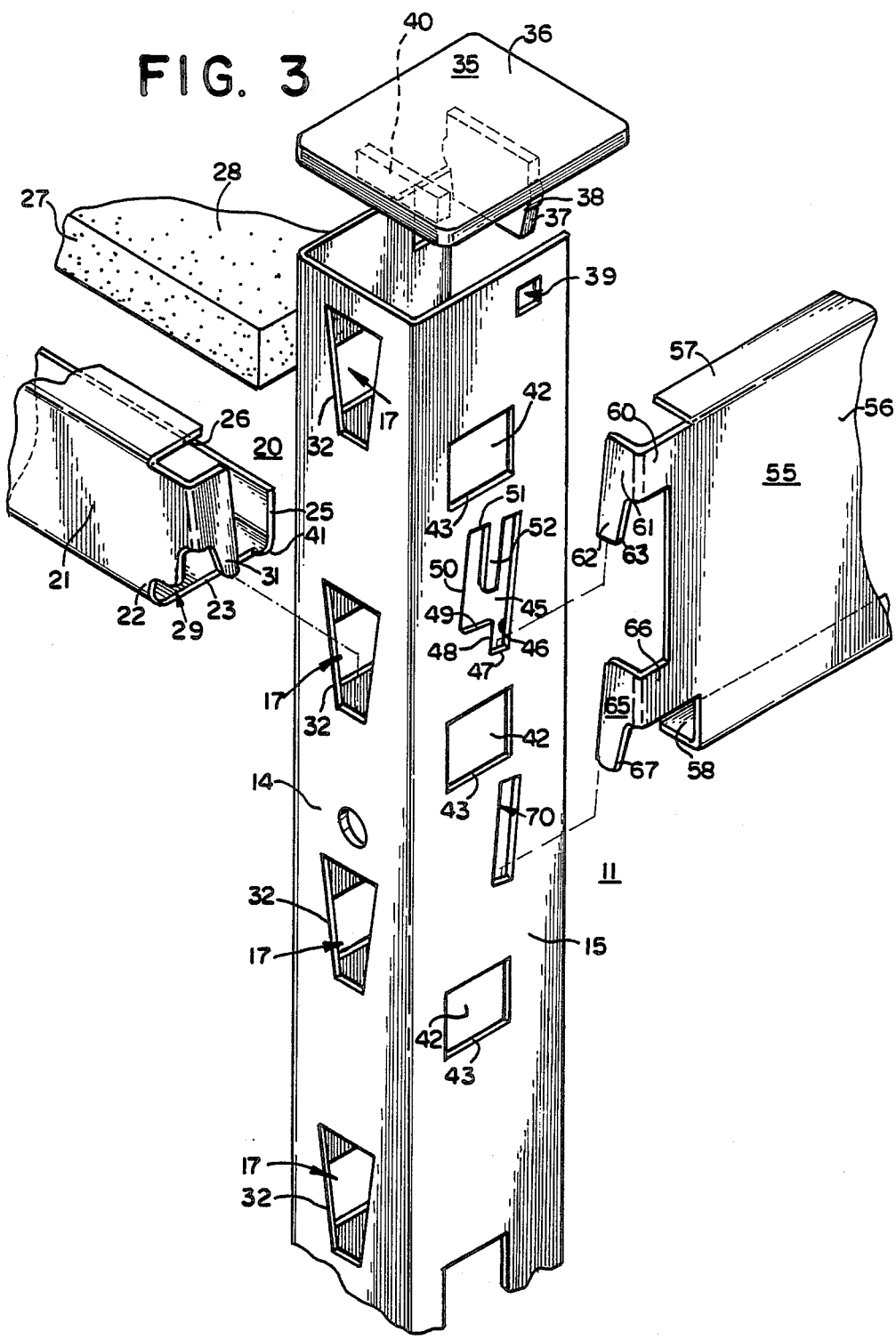
FIG. 3 is an exploded perspective view, enlarged, of the structure shown in FIG. 2.

The wedging tongue 31 is at an angle of approximately 8° with respect to a vertical plane extending along wall 22, and compliments the angle formed by the side 32 of opening 17 with the edges of walls 15 and 11 which opening is nearest the shelf support member 21 of FIG. 3.

The columns or posts 11 are also provided with end caps 35 which fit into the columns 11 at the ends thereof and include a flat wall 36. The flat wall 36 can be load bearing, for placement on the floor or other support surface, and has a flange 37 perpendicular thereto extending between walls 15 and 16, and with tabs 38 which can engage in openings 39 in the walls 15 and 16 for cap retention. The wall 36 has an additional perpendicular flange 40, which is parallel to flange 37, and also fits between the walls 15 and 16.

The bottom wall 23 of shelf support member 21, adjacent its intersection with flange 25 has a projection 41, which fits into one of a plurality of openings 42 in side wall 15, and in assembled condition is supported on edge 43 of opening 42 the projection 41 transfers the load on shelves 28 which are carried by flange 25, to edge 43 of opening 42 and thereby to post 11. The projection 41 also prevents the shelf support member 21 from twisting due to the weight on flange 25 of the shelves 28 and any material (not shown) that may be thereon. The openings 42 are of generally square configuration and located below the openings 17 at spaced locations, and are present in both walls 15 and 16.

The walls 15 and 16 are also provided with a plurality of spaced openings 45 which are of upside down h-shaped configuration with edges 46 at an angle of 6° with respect to the vertical edges of the walls 15 and 16.

Referring to FIG. 3, the edges 46 have a bottom edge 47 perpendicular thereto, an edge 48 perpendicular to edge 47, which extends vertically upwardly and intersects an edge 49, which is perpendicular thereto and extends to the left, to intersect a perpendicular vertical edge 50. The edge 50 has an edge 51 perpendicular thereto to a rectangular locking tongue 52, which intersects an edge 53 in the same plane as edge 51 and extends to edge 46.

The connecting member 55 is of generally U-shaped configuration, with a vertical outside wall 56 as shown in FIG. 3 with horizontal top and bottom walls 57 and 58 extending perpendicularly inward. The member 55 at each end is provided with an upper connecting portion 60, which includes an L-shaped extension 61 extending from wall 56 with an angularly related wedging tongue 62 which in locking position engages edge 46 and has an end extension 63 which extends downwardly past edge 47 for retention therein.

The locking tongue 52 can be bent to retain the tongue 62 of horizontal connecting member 55 in opening 42 of column 11.

The members 55 also include lower connecting portions 65 similar to portions 60 with L-shaped extensions 66 from walls 56 and angularly related tongues 67 which can engage in slots 70 in side wall 15 or 16.

The slots 70 which are spaced below openings 42 are of elongated rectangular configuration, and are at the same angle with the edges of walls 15 and 16 as is edge 46.

The mode of use and operation will now be pointed out.

The posts or columns 11 are selected and pairs are formed into rack ends 12 by inserting wedging tongues 62 and 67 of connecting members 55 in opening 42 and slot 70 of column 11.

The locking tongues 52 can be bent to engage tongues 62 and retain the structure in assembled condition. Wedging tongues 31 of shelf support members 21 are inserted into openings 17 in wall 14 of columns and projections 41 extend into openings 42 and are supported on edge 43 of opening 42, between adjacent pairs of rack ends 12 to form an assembled rack. Shelves 28 can then be put into the shelf support members 21 for use.

It will thus be seen that storage racks in accordance with the invention and the objects have been provided.

I claim:

1. A storage rack which comprises
a plurality of upright posts of U-shape in cross section each with an outside wall and with side walls perpendicular to said outside wall,
said outside walls each having a plurality of truncated cone-shaped openings at spaced vertical locations therealong,
said side walls each having a plurality of inverted h-shaped openings at spaced vertical locations therealong, said inverted h-shaped openings being at an angle with respect to said outside wall,
said side walls each having a plurality of elongated slot openings at spaced vertical locations therealong between said inverted h-shaped openings and at an angle with respect to said outside wall,
connecting members for fastening pairs of posts together to form a rack end,
said connecting members each have pairs of extensions and angled wedging tongues at each end for insertion into said inverted h-shaped openings and said elongated slot openings of said posts for connection and retention of posts thereto,
said post side walls having a plurality of square shaped vertically spaced openings at spaced locations therealong,
shelf support members for supporting loads and for connection of pairs of said rack ends together to form a rack,
said shelf support members having at least one angled wedging tongue at each end thereof for insertion into said truncated openings of said outside walls for connection, and at least one projection at each end for insertion into one of said square shaped openings in said post side wall for retention and load transfer to said post, and
a plurality of load bearing shelves engaged with said shelf support members.

2. A storage rack as defined in claim 1 in which said posts have end caps in the ends thereof.

3. A storage rack as defined in claim 1 in which
said h-shaped openings in said posts have locking tongues which can be bent to engage and retain at least one of said wedging tongues of said connecting members therein.

* * * * *

UNITED STATES PATENT AND TRADEMARK OFFICE
CERTIFICATE OF CORRECTION

PATENT NO. : 4,796,541

DATED : January 10, 1989

INVENTOR(S) : STORAGE RACK

It is certified that error appears in the above-identified patent and that said Letters Patent is hereby corrected as shown below:

Column 2,
  Line 67, "17" should be -- 27 --.

Signed and Sealed this

Sixth Day of June, 1989

Attest:

DONALD J. QUIGG

*Attesting Officer*  *Commissioner of Patents and Trademarks*